UNITED STATES PATENT OFFICE.

GEORGE M. WOLPE, OF INDIANAPOLIS, INDIANA.

MOLD FOR VULCANIZED-RUBBER DENTAL PLATES.

1,212,725.  Specification of Letters Patent.  Patented Jan. 16, 1917.

No Drawing.  Application filed January 11, 1915. Serial No. 1,623.

*To all whom it may concern:*

Be it known that I, GEORGE M. WOLPE, a subject of the Czar of Russia, residing at Indianapolis, in the county of Marion and State of Indiana, have invented certain new and useful Improvements in Molds for Vulcanized-Rubber Dental Plates, of which the following is a specification.

This invention relates to molds employed for making vulcanized rubber dental plates.

The ordinary method of vulcanizing dental rubber is to invest the same in plaster of Paris mixed with water, after which the flask containing the rubber and its investment is placed in a vulcanizer and subjected to a heat treatment until the rubber obtains the proper degree of hardness, this heat treatment usually taking about two hours.

The present invention has for its object to reduce the time required to effect vulcanization of the rubber, and to this end it consists in a mold composition or material which is composed of ordinary plaster of Paris mixed with zinc oxid, the best results being obtained by using two thirds plaster of Paris and one third zinc oxid, these ingredients being well mixed to form a powder. In using the material, enough water is added to form a plastic mass which is shaped to the desired configuration of the mold.

The rubber is invested in the ordinary way, and the flask is then placed in the vulcanizer.

By employing the herein described composition of matter for the mold or investment, the rubber can be perfectly vulcanized in not more than thirty-five minutes. If the vulcanizer is not in good condition, a temperature of about 320 degrees Fahrenheit is necessary and the process also takes about five minutes longer. In either case there is a considerable saving of time.

The sulfur in the rubber unites with the zinc oxid, which produces a chemical action resulting in a more rapid vulcanization, as has been found by actual tests.

The invention is applicable to all kinds of dental and hard rubber vulcanizing.

I claim:

A mold employed for vulcanizing rubber, having its body composed of plaster of Paris and zinc oxid.

In testimony whereof I affix my signature in presence of two witnesses.

GEORGE M. WOLPE.

Witnesses:
MILTON L. CLAWSON,
C. E. MORGAN.

Copies of this patent may be obtained for five cents each, by addressing the "Commissioner of Patents, Washington, D. C."